United States Patent Office 2,775,594
Patented Dec. 25, 1956

2,775,594

STABILIZATION OF POLYMERIZABLE HETEROCYCLIC NITROGEN COMPOUNDS

Mack F. Potts, Paul S. Hudson, and Warren L. Smith, Bartlesville, Okla., assignors to Phillips Petroleum Company, a corporation of Delaware No Drawing. Application May 27, 1952,
Serial No. 290,321

10 Claims. (Cl. 260—283)

This invention relates to the stabilization of polymerizable materials. In one of its aspects this invention relates to the stabilization of polymerizable heterocyclic nitrogen compounds under storage and handling conditions and during distillation or at elevated temperatures. In another of its aspects this invention relates to a method for preventing loss of heterocyclic nitrogen compounds due to polymerization.

It is well known that unsaturated, polymerizable heterocyclic nitrogen compounds tend to polymerize during storage and various handling conditions, especially during distillation, and consequently yields and recovery of these compounds are often considerably diminished due to this unwanted and undesirable polymerization. Also, besides reducing yields and recovery of these polymerizable heterocyclic nitrogen compounds, often the polymerized material adversely affects the reactions wherein these polymerizable compounds are employed as reactants, as well as the products which are derived from these reactions.

Accordingly, it is an object of this invention to prevent and/or inhibit the polymerization of polymerizable heterocyclic nitrogen compounds during storage and other handling conditions. It is another object of this invention to inhibit the polymerization of these materials at an elevated temperature and especially during distillation. It is still another object of this invention to provide polymerization inhibited compositions comprising a polymerizable heterocyclic nitrogen compound. It is yet another object of this invention to provide a polymerization inhibited composition comprising a vinyl-substituted pyridine. In at least one embodiment of this invention at least one of these objects will be accomplished.

In accordance with this invention it has now been found that the sulfides of selenium and tellurium are effective as polymerization inhibitors for polymerizable heterocyclic nitrogen compounds. Selenium and tellurium sulfides which are applicable in the practice of this invention include selenium monosulfide SeS, selenium disulfide SeS$_2$, and the various tellurium sulfides, especially tellurium disulfide TeS$_2$. Of course, mixtures of these sulfides may be used.

These sulfides are effective as polymerization inhibitors over a wide range of temperatures, from below and about 40° F. up to and above 400° F. The amount of these polymerization inhibiting sulfides which need be added to inhibit polymerization usually varies with the amount and type of polymerizable heterocyclic nitrogen compound to be inhibited. Often a trace of these sulfides is sufficient in the presence of a polymerizable heterocyclic nitrogen compound to inhibit the polymerization of these compounds. Usually an amount of sulfide in the range 0.001 to 5.0% by weight, preferably in the range 0.05 to 1.0% by weight, based on the weight of the polymerizable heterocyclic nitrogen compound is sufficient. Larger amounts of these sulfides, even as high as 10% by weight and higher can be used if desired, although under most circumstances this is not necessary.

These sulfides are only slightly soluble in the polymerizable heterocyclic nitrogen compounds and as a result the sulfides are usually present therewith in a finely divided solid state, preferably as a stable suspension in the nitrogen base or otherwise intimately and/or homogeneously admixed therewith. A sulfide, such as selenium monosulfide, is generally added as a fine powder to the compound to be inhibited against polymerization and the mixture stirred and agitated to disperse the sulfide therein. If desired or necessary the mixture may be warmed in order to better disperse and/or dissolve the sulfide therein.

The recovery of these sulfides from the polymerizable heterocyclic nitrogen compound with which admixed is relatively simple and easily effected. After storage, handling or shipment of the stabilized heterocyclic nitrogen compound, the compound can be easily and readily separated and recovered from the polymerization-inhibiting sulfide either by distillation, preferably under a reduced pressure, or by any other convenient manner such as by filtration, settling, decanting, etc.

The polymerizable heterocyclic nitrogen compounds which are inhibited against polymerization by selenium and tellurium sulfides in accordance with this invention include the polymerizable heterocyclic nitrogen compounds of the pyridine and quinoline (including isoquinoline) series, especially the nuclear (ring) alkyl substituted derivatives thereof. These polymerizable heterocyclic nitrogen compounds include the

substituted nitrogen compounds wherein R is a hydrogen atom or a hydrocarbyl (containing only carbon and hydrogen atoms) radical, preferably having not more than 12 carbon atoms. The vinyl substituted compounds, especially those containing only one substituent vinyl group, as well as the nuclear alkyl substituted derivatives thereof are particularly applicable in the practice of this invention. It is preferred however, that the total number of carbon atoms in the nuclear (ring) substituted alkyl group or groups be not more than twelve. In addition to the vinyl substituted heterocyclic nitrogen compounds the isopropenyl substituted compounds (i. e. a vinyl group having a methyl substituent in the alpha position) can also be inhibited. Typical heterocyclic nitrogen compounds which are applicable in the practice of this invention include the vinyl-substituted pyridines and the vinyl-substituted quinolines. These compounds include the 2-vinyl pyridines such as 2-vinylpyridine; 5-methyl-2-vinyl-pyridine; 5-ethyl-2-vinylpyridine, also the 5-vinyl-pyridines such as 5-vinyl-pyridine; 2-methyl-5-vinylpyridine, also the divinyl pyridines such as 2,5-divinylpyridine; 3-methyl-2,5-divinylpyridine. Other compounds which are also applicable in the practice of this invention include 4-methyl-3-vinylpyridine, 2-isopropenylpyridine; 5-propyl-2-isopropenylpyridine; 2-octyl-5-vinylpyridine and the various polymerizable quinoline and isoquinoline compounds such as 2-vinylquinoline, 8-ethyl-2-vinylquinoline; 4-hexyl-5-vinylquinoline; 1-vinylisoquinoline; 5-methyl-1-isopropenylisoquinoline; 1,8-divinylisoquinoline; 2,5,8-trivinylquinoline, 6,7-dimethyl-2,3-divinylquinoline, etc. Generally, and as indicated, any polymerizable, especially vinyl substituted pyridine, quinoline or isoquinoline is applicable in the practice of this invention.

Other polymerizable heterocyclic nitrogen compounds which can be used in the practice of this invention include the

substituted (as hereinbefore defined) piperidines (hexahydropyridine), pyrroles, pyrrolidines, especially the vinyl-substituted piperidines, pyrroles, pyrrolidines and their alkyl derivatives.

The use of elemental sulfur as a polymerization inhibitor for vinyl-substituted aromatic hydrocarbons, such as styrene, has been known for some time. However selenium sulfides and tellurium sulfides, especially selenium monosulfide, as a polymerization inhibitor in the practice of this invention for polymerizable heterocyclic nitrogen compounds is much superior to sulfur.

The following examples set forth hereinafter are illustrative of this invention and specific details for operating the present invention are described with comparative results, showing the improvements obtained by this invention. However, as indicated, these examples are merely illustrative and not limitive of this invention.

Example I

The effectiveness of selenium sulfide as a stabilizer for 2-methyl-5-vinylpyridine was tested by the addition of 0.2 percent selenium monosulfide based on the weight of 2-methyl-5-vinylpyridine. Two samples were prepared and heated at a temperature of 200° F. for 24 hours. One sample was heated in air and the other in atmosphere of nitrogen. The unreacted 2-methyl-5-vinylpyridine was removed by vacuum distillation at a pressure less than 1 mm. Hg. The polymer which remained was weighed and the percent polymerization calculated. For comparative purposes two similar runs were made using 0.2 percent sulfur in each case, heating one sample in air and the other in an atmosphere of nitrogen. The following results were obtained:

| Additive | Percent Polymerization | |
|---|---|---|
| | Air | Nitrogen |
| Selenium monosulfide | 3.03 | 2.74 |
| Sulfur | 8.14 | 7.51 |

Example II

Selenium monosulfide (0.3 percent) was added to 2-methyl-5-vinylpyridine and the mixture was heated in an atmosphere of nitrogen for 24 hours at a temperature of 200° F. Another sample of 2-methyl-5-vinylpyridine was heated under the same conditions except that 0.3 percent sulfur was employed as the additive. The following results were obtained Additive:                     Percent polymerization
    Selenium monosulfide _____ 2.57
    Sulfur _____ 4.31

As will be obvious to those skilled in the art many substitutions, variations and modifications can be made in the light of the foregoing disclosure without departing from the spirit or scope of this disclosure or invention.

We claim:

1. A process for inhibiting the polymerization of a heterocyclic nitrogen compound represented by the following structural formula:

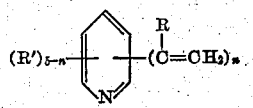

wherein $n$ is an integer selected from the group consisting of 1 and 2, R is selected from the group consisting of H and CH$_3$, and each R' is individually selected from the group consisting of H and alkyl radicals, not more than 12 carbon atoms being present in the total of said R' radicals, which comprises adding to said heterocyclic nitrogen compound a polymerization inhibiting amount of a sulfide selected from the group consisting of the sulfides of selenium and tellurium.

2. A composition comprising a heterocyclic nitrogen compound represented by the following structural formula:

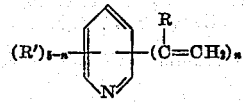

wherein $n$ is an integer selected from the group consisting of 1 and 2, R is selected from the group consisting of H and CH$_3$, and each R' is individually selected from the group consisting of H and alkyl radicals, not more than 12 carbon atoms being present in the total of said R' radicals, and a polymerization inhibiting amount of a sulfide selected from the group consisting of the sulfides of selenium and tellurium.

3. A process for inhibiting the polymerization of 2-methyl-5-vinylpyridine which comprises adding to said compound a polymerization inhibiting amount of a sulfide selected from the group consisting of the sulfides of selenium and tellurium.

4. A composition comprising 2-vinylpyridine and a polymerization inhibiting amount of a selenium sulfide.

5. A composition comprising 2-methyl-5-vinylpyridine and a polymerization inhibiting amount of a selenium sulfide.

6. A composition comprising 2-methyl-5-vinylpyridine and a polymerization inhibiting amount of selenium monosulfide.

7. A composition comprising 2-vinylpyridine and a polymerization inhibiting amount of selenium monosulfide.

8. A composition comprising 2-methyl-5-vinylpyridine and at least 0.001% by weight, based on the 2-methyl-5-vinylpyridine of a sulfide selected from the group consisting of the sulfides of selenium and tellurium.

9. A process for inhibiting the polymerization of 2-methyl-5-vinylpyridine which comprises adding to said compound at least about 0.001% by weight, based on said compound, of selenium monosulfide.

10. A composition comprising 2-methyl-5-vinylpyridine and between 0.001 and 10% by weight, based on said composition, selenium monosulfide.

References Cited in the file of this patent

UNITED STATES PATENTS

| | | |
|---|---|---|
| 1,950,438 | Carothers | Mar. 13, 1934 |
| 2,166,125 | Britton | July 18, 1939 |